United States Patent [19]

Kovac

[11] Patent Number: 4,700,070
[45] Date of Patent: Oct. 13, 1987

[54] RADON GAS DETECTION APPARATUS AND METHOD

[76] Inventor: Matthew Kovac, 28 Woodruff Dr., Carnegie, Pa. 15106

[21] Appl. No.: 877,305

[22] Filed: Jun. 23, 1986

[51] Int. Cl.$^4$ ............................................. G01V 5/00
[52] U.S. Cl. ............................. 250/304; 250/432 PD; 250/472.1
[58] Field of Search ................ 250/253, 304, 432 PD, 250/435, 472.1, 380

[56] References Cited

U.S. PATENT DOCUMENTS 4,277,682 7/1981 Madelaine et al. ................ 250/380
4,464,574 8/1984 Vandrish ...................... 250/432 PD
4,518,860 5/1985 Alter et al. ........................ 250/472.1

Primary Examiner—Bruce C. Anderson
Attorney, Agent, or Firm—William J. Ruano

[57] ABSTRACT

A radon sampling unit comprising a cylindrical body containing a measured amount of charcoal for collecting and holding radon gas. A fine mesh screen is frictionally held on top of the charcoal by a retaining ring engageable with the inner sidewall of said body. The lid is screw threaded and hermetically sealed to the body. A layer of dessicant is frictionally held inside the body vertically spaced above the charcoal. The cylindrical body has a plurality of alternate lugs on top thereof at different heights and a retaining metallic ring which serves as a unique method of retention of the lid assembly to the body. The cylindrical body may be modified by having an interior spirally wound metallic sheet to vary the inner diameter of the body as desired.

3 Claims, 3 Drawing Figures

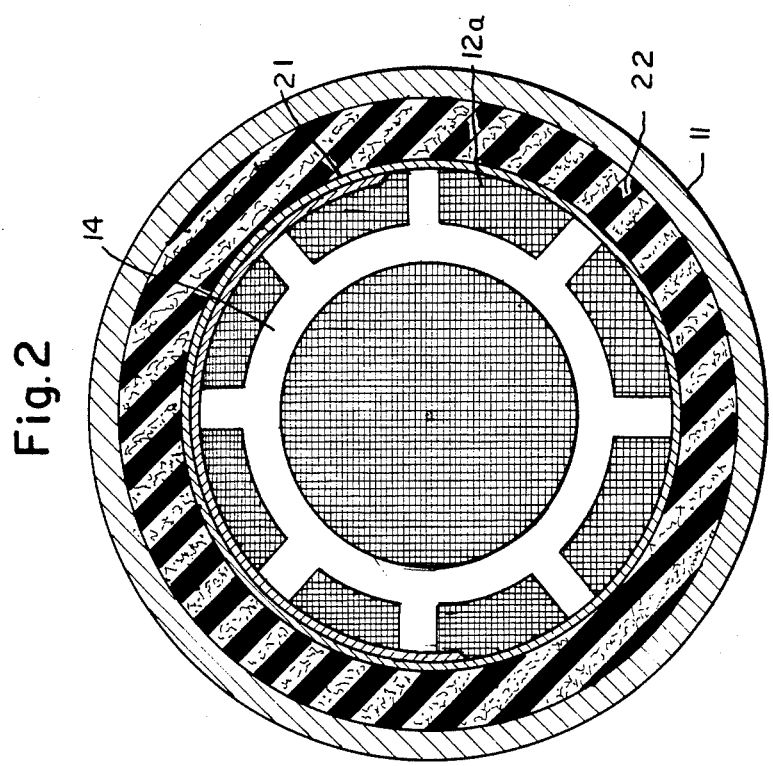
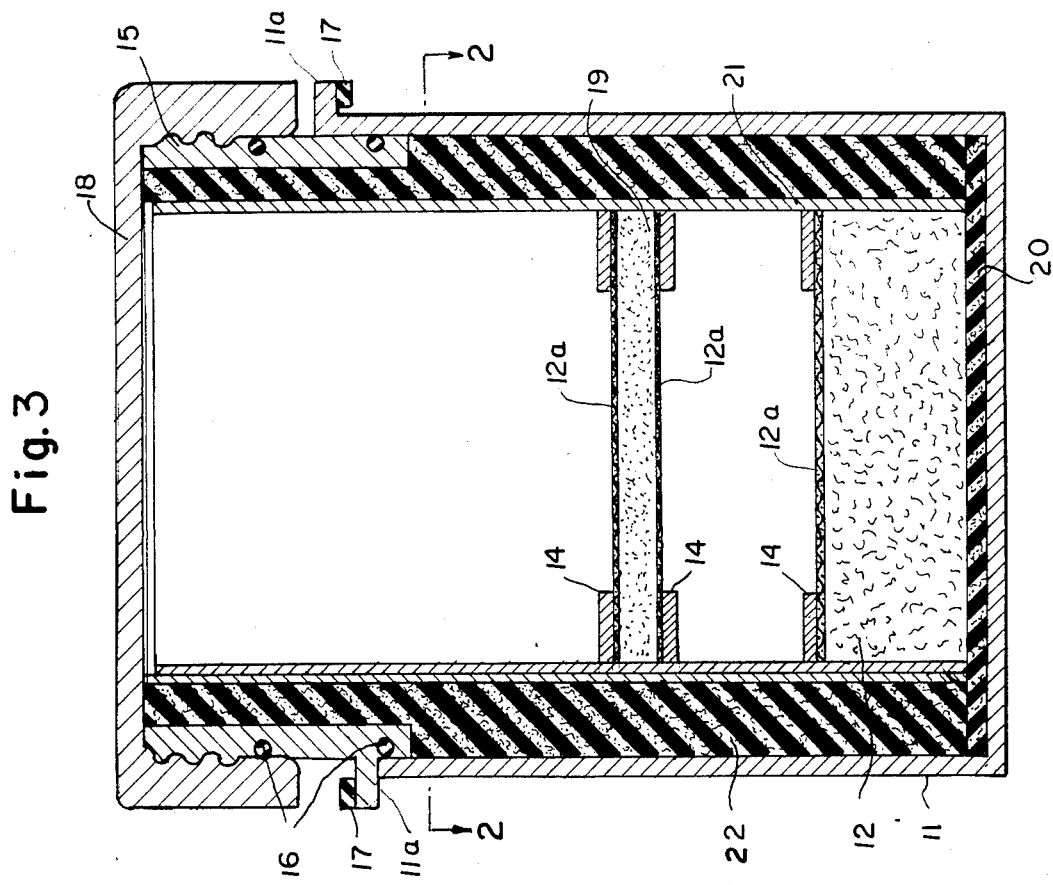

RADON GAS DETECTION APPARATUS AND METHOD

This invention relates to a high volume, low cost radon gas detection apparatus and method.

BACKGROUND OF THE INVENTION

Excess radon gas in domestic homes can be a health hazard to its occupants. Radioactive decay products from radon gas have been linked to lung cancer. It is unknown today how many homes have excess radon gas levels. A simple inexpensive method is needed to identify homes that have radon gas levels above the recommended "safe" levels. The method should determine "average" radon level, in lieu of traditional "grab sampling techniques", since home radon levels are known to fluctuate. Averaging by sampling over a long time period is not desirable, however, since an "unsafe" home environment should be identified as soon as possible.

SUMMARY OF THE INVENTION

The system utilizes a sampling unit which "averages" or integrates the room radon level over a desired time period. The sampling unit is opened by the homeowner, after receipt by mail, and placed in a heavily used portion of the home for the prescribed time period. It is then resealed and sent via first class mail to the test facility. The test facility counts gamma rays generated by the sampling unit and through a computer calibration program, correlates this to the radon level in the home during the sampling period. A test report is automatically printed out and sent to the homeowner within 10 working days.

As stated above, the test method is a two part sequence—(1) home air sampling by the homeowner using the sampling unit, and (2) analysis of the sampling unit at the test facility.

After the homeowner exposes and reseals the radon sampler, it is sent by mail to the test facility where a determination of the homeowner's radon level will be made. A high volume approach to testing is developed to support a nationwide test program, while at the same time, keeping consumer test costs to a minimum. However, the same test sequence described below can be used for any number of "samplers", including a single "exposed" unit.

BRIEF DESCRIPTION OF THE DRAWINGS

FIG. 2 is a cross-sectional view of the radon sampler of the present invention, taken along line 2—2 of FIG. 3; and FIG. 3 is a vertical cross-sectional view thereof.

DESCRIPTION OF THE PREFERRED EMBODIMENTS

Figure 1:
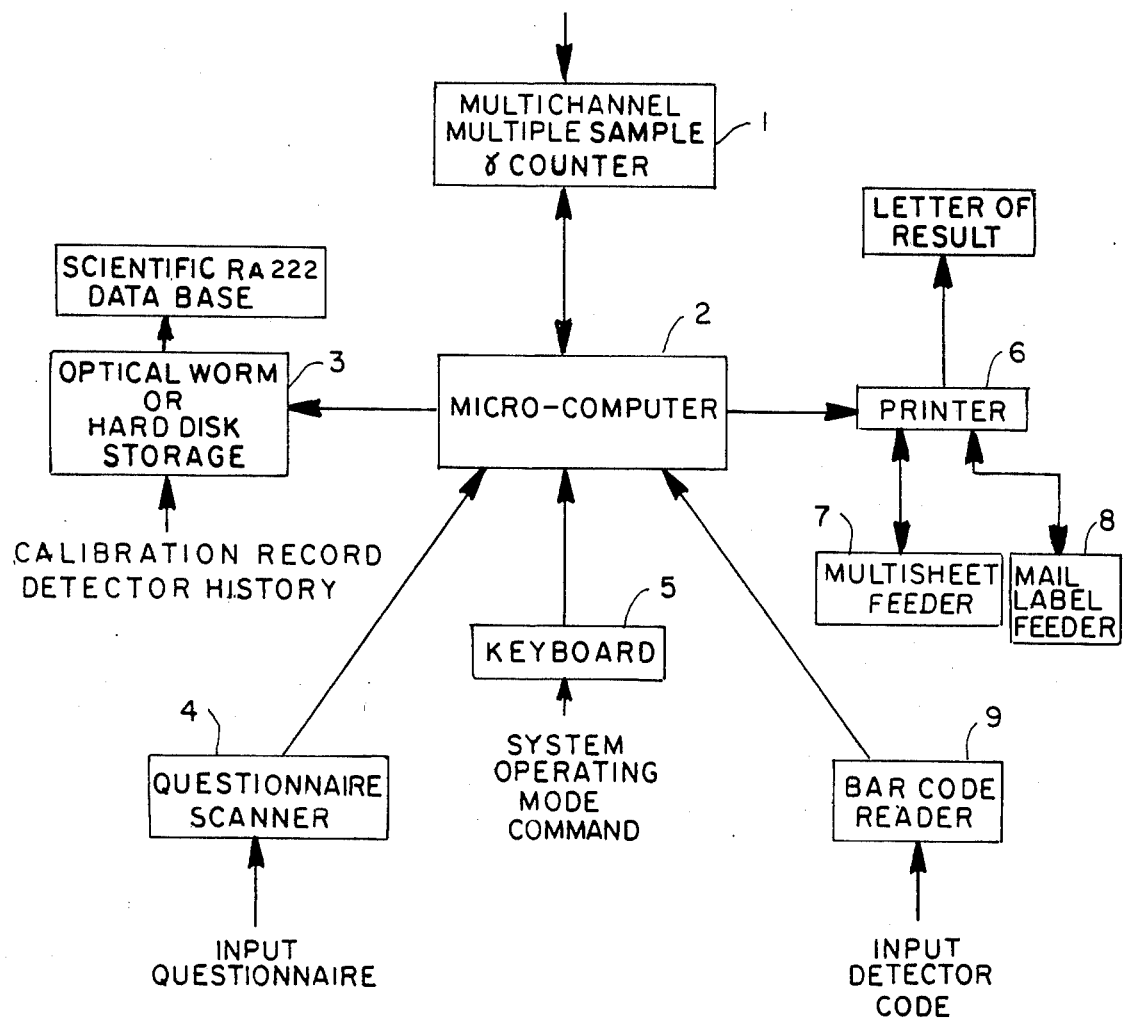
FIG. 1 is a block diagram showing the operation sequence.

A bar code label located on each "exposed" sampler is read into a central micro-computer 2 (FIG. 1), using a standard off-the-shelf bar code reader 9. This reduces the labor intensive data entry as required by traditional mass production (keyboard) systems. The number read by the computer through the bar code reader 9 identifies a location in the computer memory where historical and other pertinent data for the subject sampler is stored. This storage medium is a separate peripheral 3 called an optical WORM, or "Write Once Read Memory". The WORM permits massive amounts of storage data on small optical or laser-read disks, reducing the need for large files or paper data; thereby reducing facility/inventory control (data) costs. If a smaller data base is expected, traditional computer "fixed" or hard disk storage can be utilized. Both the WORM and the hard disk are standard off-the-shelf units. Incorporating all peripheral units into the system requires special computer software to permit communications with the central computer unit 2 so as to perform its functions in a timely manner. A questionnaire. filled out by the homeowner after sampler "exposure", contains pertinent data regarding the present sampler exposure time and environmental conditions during the test exposure. This information is fed into the central computer automatically with a scanner 4, thereby eliminating labor intensive keyboard data entry. The questionnaire also contains pertinent marketing and sales information in addition to scientific data about the homeowner's physiological history to support scientific studies of the health risks associated with excess home radon levels. Peripherals (items 1, 3, 4, 6–9) can be controlled manually by the operator through keyboard entry 5. The exposed testers are put into a gamma ray counting system 7 and gamma rays generated by each tester in the energy levels associated with radon are counted, and count information is then transmitted to the central computer. Knowing the environmental, gamma counts and exposure parameters for each sampler, the computer can determine the radon level corresponding to the "exposure" period. This determination is made using an algorithum (of calibration factors) developed by previous laboratory testing of the sampler unit design in calibrated radon chambers. After calculating the radon level for each detector, a report is printed by a dot matrix printer 6 and a mailing label (with the homeowner's name and address) is generated for each corresponding test report.

These reports are generated on a production basis using a blank test report sheet feeder 7 and a mailing label feeder 8 to the printer.

The sampler units can then be removed from the counting unit 1 and disassembled. If desired, the charcoal beds can be baked in an oven to drive out any radon and sealed for reuse. This "available for reuse" status and baking time history of the detector is updated on the computer memory 3 through a keyboard update. In this way, an up-to-date status of any homeowner's test can be easily and quickly accessed by the facility manager/operator to support consumer questions or productivity of the test facility.

Referring to FIGS. 2 and 3, the test device is made up of a thermoplastic cylindrical body 11 configured to permit low-cost mass production. The body holds an accurately measured amount of charcoal 12 which collects and holds the radon gas. The charcoal bed 12 is held securely in position by a fine mesh steel screen 12a which is secured (by frictional forces) to the body by a standard "off-the-shelf" circular push-on type retaining ring 14. The retaining ring is easily installed, permitting assembly of the sampler on a mass production basis by a robot or other automated means. An adapter 15 is inserted into the body and sealed by standard elastomeric O-rings 16.

Diametral clearance between the adapter and body is controlled via plastic injection molding to ensure a tight seal to prevent the escape of radon gas after "sampling".

The adapter is secured to the body by the combination of alternate lugs 11a molded on the body and adapter to prevent relative rotation during lid tightening and loosening, and by the single retaining ring 17 to prevent excess relative axial translation.

The retaining ring can be easily removed to permit separation of the body and charcoal bed from the remaining embodiment. This permits a baking operation on the charcoal bed (after exposure and counting) to drive out all radon from the bed, permitting reuse after sealing for the next sampling period.

The adapter/lid assembly 15/18 is designed to permit fast insertion and sealing (via automated means) after baking to prevent the charcoal from absorbing unwanted contaminants, such as water vapor or even radon gas, at the assembly location. The lid 18 engages a mating two-to-three turn stub acme thread on the adapter to permit ease of opening and prevent crossthreading by the homeowner.

The lid is sealed using the same O-ring 16 method. The lip on the lid is chamfered to prevent O-ring rolling or tearing and guarantees a seal under the various "tightening" interpretations by the homeowner at the end of the exposure period. Homeowner sealing is critical since a lid seal failure or marginal sealing technique would permit escape of the sampled radon gas during sampler transit thereby invalidating the test.

Finally, a humidity dessicant 19 is placed over the opening of the charcoal bed to absorb moisture and reduce the number of storage sites in the charcoal bed taken by water molecules which would displace radon storage. The dessicant permits the diffusion of radon and helps integrate the room radon fluctuations by creating a diffusion barrier. Utilizing the science of gas diffusion theory, the dessicant, charcoal bed diameter and dessicant height above the charcoal can be varied as required to develop the desired integrating time constant (i.e., homeowner "exposure" period) for the sampler.

The particular embodiment utilizes off-the-shelf type dessicants which are low cost and easily available. The diffusion characteristics of radon gas through the dessicant is determined empirically since little is known about radon diffusion characteristics through standard dessicants. Although the overall time constant for the detector is predicted, based on diffusion gas theory and the dessicant characteristics, actual time constant determination must be empirically using a calibrated radon chamber.

The overall sampling unit embodiment is low cost, mass producible, can be easily assembled by an automated process, and can be reused keeping overall cost of the test to the consumer at a minimum. The sampler can be bar coded with imprinted or stick-on bar code labes to permit mass inventory control reducing facility costs.

An important novelty of the present invention is its ability to integrate or "average" out fluctuations in the home radon level during the exposure period. This provides the homeowner with a more realistic representation of "average" radon exposure during the homeowner's lifetime when compared to grab sampling techniques. The latter could "grab" sample the home radon level at a peak or valley of radon concentration fluctuation giving the homeowner an errant lifetime "average" radon level exposure reading. Identifying the time constant of the sampling unit is a way of identifying the period of time over which the sampler "best" averages the radon level which correlates to the best accuracy the test method can achieve. The time constant corresponds to the time period the homeowner should leave the sampler "exposed" (open); the end of the exposure corresponds to the time in which the lid is replaced to seal the unit.

As stated above, the actual time constant for a sampler is developed empirically using calibrated radon chambers, but a target time constant for the unit can be determined theoretically based on gas diffusion theory. This theory has proven that the time constant is a function of the length-diameter (L/D) ratio of the air pocket between the charcoal bed and the diffusion barrier. By adjusting the "L" or "D", or a combination thereof and the type of dessicant used, the time constant can be adjusted.

To permit the desired time constant adjustment, internal geometry modifications can be made to the sampler without affecting the outer embodiment. A spiraling length of sheet metal 21 is rolled into a cylindrical shape defining the "D" value. By adjusting the overlap of the sheet metal ends, the "D" diameter value can be adjusted to any diameter which would accommodate the available "off-the-shelf" retaining rings 14. The "L" value can be adjusted by overcoming frictional forces between the dessicant retaining rings on the inside diameter surface of the sheet metal. These frictional forces are of sufficient magnitude to maintain the "L" position during normal exposure, transit and testing. A bake-resistant elastomeric pad 20 provides a boundry seal to direct the radon with the projected 4-D configuration.

Small escapes of radon between the sheet metal and this seal would be of little consequence toward affecting the sampler time constant. This is because the diffusion paths (through the L/D geometry) would be of much less resistance to radon translation than the leak path through the foam material 22 on the outside of the sheet metal (i.e., the high resistance path would act essentially as a solid radon barrier).

If the "adjustable" feature of the sampling unit time constant is not required or desired due to cost, the outer body adaptor 15 and lid 18 can be sized properly to create a desired fixed-time constant sampler assemblage. In this case, items 20, 21 and 22 would be ommitted.

While I have illustrated and described several embodiments of my invention, it will be understood that these are by way of illustration only and that various changes and modifications may be contemplated in my invention and within the scope of the following claims.

I claim:

1. A radon sampling unit comprising a cylindrical body containing a measured amount of charcoal for collecting and holding radon gas, a fine mesh screen inside said body and resting on said charcoal, retaining ring means engageable with the inner sidewall of said cylindrical body for frictionally holding said charcoal in place, a lid screw threaded to said body and hermetically sealed thereto, a layer of dessicant spaced vertically above said measured amount of charcoal to absorb moisture and permit diffusion of radon gas and help integrate radon fluctuations by creating a diffusion barrier, and a cylindrical element removably mounted adjacent the inner wall of said cylindrical body to enable replacement thereof with a removable cylindrical element of different diameter to meet the desired L/D ratio.

2. A sampling unit as recited in claim 1 wherein said cylindrical element is a spirally wound sheet held against the inner wall of said body, the inner diameter of said spirally wound sheet being dependent upon the number of turns thereof and thereby enabling adjustment of the inner diameter.

3. A sampling unit as recited in claim 1 wherein said hermetic seal is formed by O-rings between said lid and body, a plurality of alternate lugs on the top of said body at different heights and a retaining elastomeric ring located between said lugs of different height for preventing axial movement of said lugs.

* * * * *